(12) United States Patent
Karmouch et al.

(10) Patent No.: US 7,055,170 B1
(45) Date of Patent: May 30, 2006

(54) SECURITY MECHANISM AND ARCHITECTURE FOR COLLABORATIVE SOFTWARE SYSTEMS USING TUPLE SPACE

(75) Inventors: Ahmed Karmouch, Gloucester (CA); Tom Gray, Carp (CA); Serge Mankovskii, Carp (CA); Cui Zheng, Toronto (CA)

(73) Assignee: Mitel Networks Corporation (CA)

( * ) Notice: Subject to any disclaimer, the term of this patent is extended or adjusted under 35 U.S.C. 154(b) by 1114 days.

(21) Appl. No.: 09/676,838

(22) Filed: Sep. 29, 2000

(30) Foreign Application Priority Data

Oct. 5, 1999 (GB) ................................. 9923544.2

(51) Int. Cl.
*G06F 17/30* (2006.01)
*G06F 15/16* (2006.01)
*H04L 9/32* (2006.01)
*G06K 9/00* (2006.01)

(52) U.S. Cl. ................................. 726/2; 726/4; 726/14
(58) Field of Classification Search ................. 713/201
See application file for complete search history.

(56) References Cited

U.S. PATENT DOCUMENTS

| | | | | |
|---|---|---|---|---|
| 4,845,749 A | * | 7/1989 | Brickell et al. | ............... 380/46 |
| 5,974,420 A | * | 10/1999 | Lehman et al. | ............. 707/101 |
| 6,170,061 B1 | * | 1/2001 | Beser | ......................... 713/201 |
| 6,553,402 B1 | * | 4/2003 | Makarios et al. | ........... 709/201 |

* cited by examiner

*Primary Examiner*—Gilberto Barrón, Jr.
*Assistant Examiner*—G. Gurshman
(74) *Attorney, Agent, or Firm*—Jones Day (57) ABSTRACT

According to the present invention, a virtual network communication system is provided for effecting secure communications between user agents at different sites within said virtual network, comprising at least one Private Tuple Space within each of the sites for effecting intra-site communications between the agents, a Shared Tuple Space for effecting inter-site communications between different sites, and a Coordinator Manager within each of the sites for receiving user initiated communication requests from the Private Tuple Space to communicate between user agents at the different sites, authenticating the requests and in response dynamically creating and managing instances of Coordinators at each of the different sites which embed messages from the user agents in secure tuples using multi-layered encryption and exchange the secure tuples over the Shared Tuple Space.

9 Claims, 6 Drawing Sheets

SECURITY MECHANISM AND ARCHITECTURE FOR COLLABORATIVE SOFTWARE SYSTEMS USING TUPLE SPACE

FIELD OF THE INVENTION

This invention relates in general to mobile communications systems, and more particularly to a method of effecting secure mobile communications by means of user authentication, user authorization and communication privacy.

BACKGROUND OF THE INVENTION

One emerging and attractive paradigm in network communications is Mobile Computing, which combines traditional data networks and telecommunication networks in a mobile computing environment. Communication may be provided, not only between fixed and/or mobile devices, but also in accordance with personalized services and resources which are accessible to a mobile users at any time and place (see, for example, A. Hooda, A. Karmouch, S. Abu-Hakima, "Nomadic Support Using Agents", $4^{th}$ International Symposium on Internetworking, Ottawa, July 1998).

The increased flexibility afforded by mobile computing has come at the expense of eroded network security. When a user roams the network and remotely accesses services and/or resources on the network, network integrity can be exposed to significant security risks. Specifically, various types of attack can be launched at any enabled access location on the network. Passive wiretapping, active wiretapping, IP sniffing, and identity spoofing are only some examples of these types of attacks.

SUMMARY OF THE INVENTION

According to the present invention, a secure agent communications system is provided for operation in conjunction with a Blackboard Messaging System (BMS) such as MicMac. An overall framework is developed for a general case of multi-agent communication to mutually authenticate parties and establish secure dynamic sessions. This framework is implementation independent and capable of supporting different authentication and key exchange protocols. Moreover, the system according to the present invention accommodates both the protection of pure communication data and information used for control purposes (e.g. routing, QoS, etc.)

Therefore, in accordance with an aspect of the invention there is provided a virtual network communication system for effecting secure communications between user agents at different sites within said virtual network, comprising at least one Private Tuple Space within each of the sites for effecting intra-site communications between the agents, a Shared Tuple Space for effecting inter-site communications between different sites, and a Coordinator Manager within each of the sites for receiving user initiated communication requests from the Private Tuple Space to communicate between user agents at the different sites, authenticating the requests and in response dynamically creating and managing instances of Coordinators at each of the different sites which embed messages from the user agents in secure tuples and exchange the secure tuples over the Shared Tuple Space.

According to another aspect of the invention there is provided a method of effecting secure virtual network communications between user agents at different sites within said virtual network, comprising the steps of authenticating user initiated requests to communicate between user agents at different sites, generating and forwarding an inner key to each of the user agents at the different sites for encrypting and decrypting messages exchanged there between, and dynamically creating and managing instances of Coordinators at each of the different sites for embedding the messages in secure tuples and exchanging the secure tuples over a Shared Tuple Space between the different sites.

In accordance with yet another aspect of the invention, the method includes steps of generating two dynamic identifiers for creating the Coordinator instances and generating a hashed value of the inner key for encrypting and decrypting the secure tuples.

BRIEF DESCRIPTION OF THE DRAWINGS

A detailed description of a preferred embodiment of the present invention is provided herein below with reference to the following drawings, in which.

DETAILED DESCRIPTION OF THE PREFERRED EMBODIMENT

In the absence of explicit mechanisms, personal communication over an unsecure channel like the Internet can be viewed or modified, registered users can be impersonated, users' accounts can be compromised, etc. As discussed in greater detail below, the security principles of the present invention have been applied to a prototype mobile computing system known as Personal Mobility Management System (PMMS). This system has been designed and implemented by the Mobile Agent Alliance, which is a collaboration of the University of Ottawa, Mitel Corporation and the National Research Council of Canada. PMMS provides personalized services and access to resources for nomadic users over a network, resulting in a mobile working environment which is similar to the user's home environment. PMMS implements dynamic mapping between a user and the shared devices (or services) available at any location within the network. The dynamic mapping functionality is obtained using the Internet LDAP directory. Another inherent aspect of PMMS is universal messaging for handling the communications needs of mobile users. Messaging is largely addressed by the interaction of autonomous programs (agents), representing users, services, and data resources.

Figure 1A:
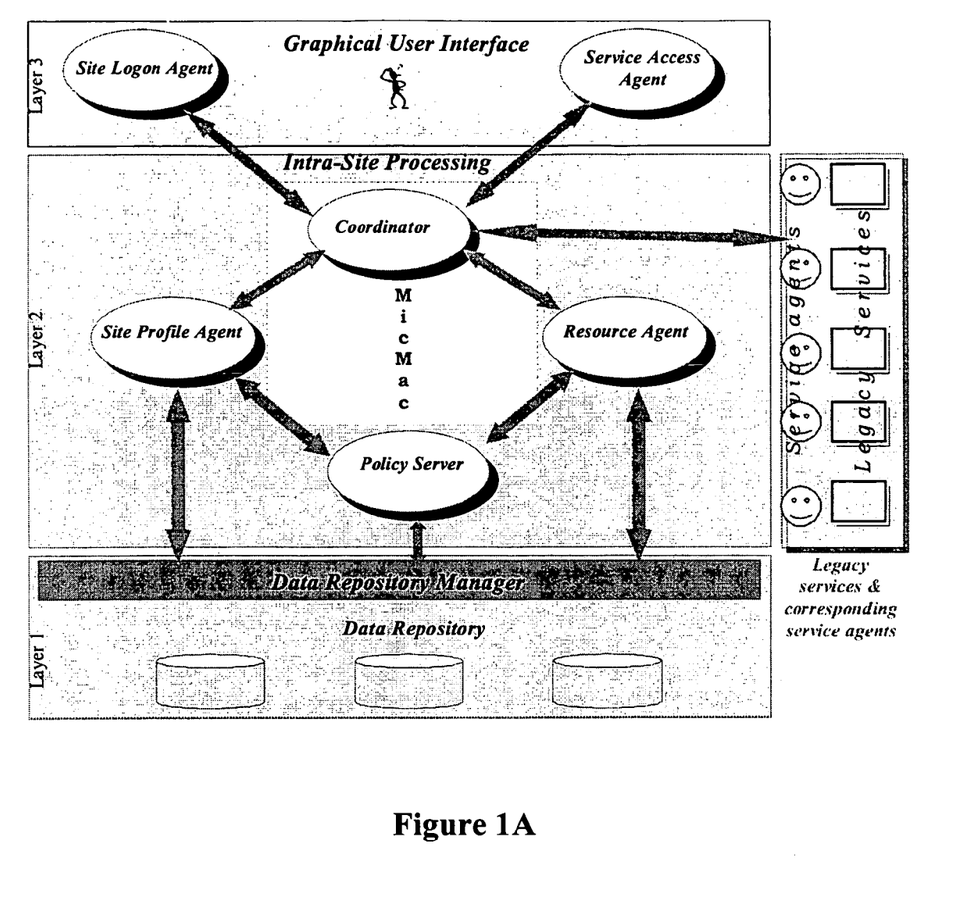
FIG. 1A is a three-layered architecture diagram of a Personal Mobility Management System (PMMS) forming the preferred environment for implementation of the present invention.

FIG. 1A shows the three-layered architecture of PMMS. Each enabled site within the virtual network maintains this or an analogous structure. Each site also manages a X.500 Directory Information Base (DIB) for its organizational network. This DIB physically resides in the first layer (i.e. in the Data Repository (referred to occasionally hereinafter as D.R.)). The first layer (Layer 1) contains all of the data information such as user profiles, service profiles and access policies. This layer is only accessible to the middle layer (Layer 2).

Layer 2 deploys intra-site processing agents, as follows:

Site Profile Agent negotiates, with its remote peer (in a user's home site), the user's preferences, and dynamically determines the authorized services for the user, in accordance with the two sets of policies of both concerned sites.

Policy Server maintains the obligations and authorizations allowed or denied to each agent. The server contains the private knowledge base (for each site) regarding authorized services, accessible resources and management rules (cost, delay, privileges, etc.).

Resource Agent negotiates, with its peer, resources for each requested and authorized service. It also creates an environment for this service. Negotiation between two resource agents determines the availability and accessibility of local resources before processing the service.

Coordinator manages the inter-agent communications. Its central role is to establish communication among two or more agents (locally or remotely), to locate agents and to control their activities when exchanging information.

Layer 3 presents a Graphical User Interface (GUI) for the nomadic users. It contains agents and interfaces for user authentication and service access. A mobile user logs onto the system via the User Logon Agent, which functions as the authentication client of the system. After receiving user information as input by the user, the User Logon Agent locates the user in the virtual network and authenticates the user as the one he/she claims to be. A Service Access Agent is responsible for providing dynamically located services to the authenticated user. This interface will not be displayed if the user cannot be identified by his/her home site.

Figure 1B:
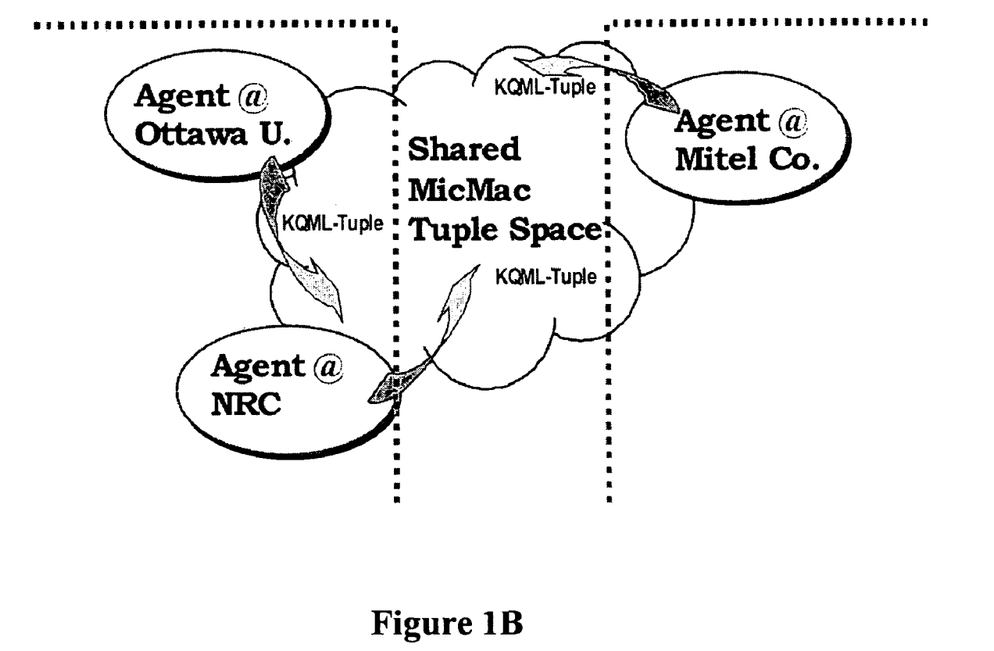
FIG. 1B is a schematic illustration of inter-site communication using a shared Agora for the PMMS system of FIG. 1A.

Interactions between agents are established through the exchange of KQML messages over the MicMac blackboard messaging system developed by Mitel Corporation (see *Feature Interaction Visualization and Resolution in an Agent Environment*, by Buhr et al in Feature Interactions in Telecommunications and Software Systems V, K. Kimbler, L. G. Bouma Eds, IOS Press, Amsterdam 1998). MicMac is a set of software tools, which provide an environment to support hands-on experimentation with multi-agent interaction and negotiation protocols. It allows for the creation and the manipulation of one or more Agoras (i.e. tuple spaces). A tuple space is an open area for exchanging information. An example of a shared tuple space is shown in FIG. 1B for effecting inter-site communication according to the principles of the present invention. In this example, the tuple space is shared among three organizations, namely Mitel Corporation, National Research Council of Canada and University of Ottawa. Inter-organization communication messages are exchanged on this shared tuple space, while each organization may implement their own private tuple space in order to handle inter agent communications.

The server supports access by co-located clients as well as by remote (networked) clients. Network connections do not directly end up at the Agora server itself; actually they are handled by a specialized local Agora client acting as a shared proxy for networked clients. The service interface offered by an Agora server consists of a small and simple set of primitives (see Table 1), which trigger specific processing requests over tuple space content.

TABLE 1

Primitive Set of Agora

| Primitives | Timeout[a] | Request Description |
|---|---|---|
| Post | Yes[b] | Add a tuple to a tuple space |
| Pick | Yes[c] | Extract a tuple from a tuple space |
| Peek | Yes[c] | Read a tuple in a tuple space |
| Cancel | No | Terminate a pending pick/peek request |

[a]optional temporal constraint (specified as an optional parameter of the primitive)
[b]constraint affects tuple persistency
[c]constraint affects request persistency The post and cancel primitives return control to the caller immediately. The pick and peek primitives however remain pending at the server until an entry in the tuple space satisfies the tuple template specified by the primitive, an associated temporal constraint takes effect, or a cancel primitive specifying a matching tuple template is issued by another client. It should be noted that the effect of a cancel primitive is not persistent (i.e. it is not withheld by a server if no matching pick/peek request exist when it is processed).

An example message exchange using tuples illustrates how communication is effected using the MicMac Agora:

1) caller Alice sends a message ("Hello") to callee Bob by performing a post operation:

post Tuple{("sender", "Alice"), ("receiver", "Bob"), ("content", "Hello")} (Tp 1)

2) in order to receive the message, callee Bob must register himself to the tuple space by launching a pick request of the same format as shown below:

pick Tuple{("sender", "Alice"), ("receiver", "Bob"), ("content", any)} (Tp 2) or pick Tuple{("sender", any), ("receiver", "Bob"), ("content", any)} (Tp 3)

In this example, "sender", "receiver" and "content" are the keys of each Tuple, while "Alice", "Bob", "Hello" are the corresponding values. These values could be Tuples as well. There is another important reserved variable called any, which can be used as the value of any key to ignore that particular attribute field. In this case, Tp 2 can extract any message from Alice to Bob, while Tp 3 can extract any message from anyone to Bob, etc. provided that all the messages use the same "sender—receiver—content" format. Consequently, both the caller and the callee must agree on a certain type of format (key combination) before they communicate. However, if some other agent has knowledge of this format, it could be able to remove or browse all the messages of this type posted on the Tuple space, thereby giving rise to several security problems. These problems include, but are not limited to message reply, modification of information, passive eavesdropping, denial of services etc.

Ensuring secure communication on top of the MicMac tuple space is essential to the entire system integrity of PMMS. As indicated above, the security strength of MicMac Agora depends on the confidentiality of the tuple format (i.e. the randomness of the keys that constitute the tuple attributes). The API of the MicMac Agora as used in PMMS does not permit an agent to pick/peek messages on the tuple space unless it has the knowledge of the key combination. Both the calling agent and the called agent must agree on a certain pattern for their communication session in order to proceed. Specifically, according to the PMMS, both agents employ a "sender—receiver—content" tuple format to exchange messages.

There are several security risks in this system. Firstly, in order to establish a secure communication session, all parties involved in the communication should secretly agree on a key combination prior to exchanging messages. In addition to adding significant processing overhead, this scheme is vulnerable to attackers, as set forth in greater detail below. Secondly, the key combination must be changed frequently. Otherwise, a compromised combination gives rise to compromised future communications using this key combination. More importantly, if a malicious agent is permitted access to the physical memory on the server which supports the MicMac Agora, the agent will be able to eavesdrop on, or arbitrarily modify any tuple.

Another example will serve to illustrate the possible consequences of a compromised key combination (namely, messages exchanged on top of MicMac being recorded, replayed, modified or removed by some entity other than the expected receiver). Assume that the format of the tuple in a communication session between Alice and Bob is "sender—receiver—content", and an attacker happens to know this format. The attacker can then issue any of the attacks listed in Table 2, for malicious purposes.

TABLE 2

Attacks on MicMac Tuple

| Attack | Action |
| --- | --- |
| Record/Eavesdropping | Peek Tuple {("sender", any), ("receiver", any), ("content", any)} |
| Remove/Denial of Service | Pick Tuple {("sender", any), ("receiver", any), ("content", any)} |
| Bomb/Denial of Service | Post Tuple{("sender", "Alice"), ("receiver", "Bob"), ("content", "It's party time!")} |
| Message Replay | Peek, then post the original Tuple in a later time |
| Message Reorder | Pick all, then post those messages in a different order |
| Modify/Active Wiretapping | Pick, change the values, then post the modified version |

In order to launch any of the above requests, the attacker requires knowledge of the tuple format between Alice and Bob. However, experience has shown that software hackers are adept at obtaining such information. In fact, this information may become available to the attacker as a result of the negotiation which must take place between Alice and Bob before they exchange the actual messages, in order to decide on the tuple format. Of course, either party (Alice or Bob) can send secure e-mail or certified mail to the other party concerning the format of their next communication. However, human intervention is required in order to change the program periodically to introduce different tuple formats. On the other hand, use of a default pattern such as "sender—receiver—content", although automatic, allows an attacker to peek the contents of the messages exchanged between Alice and Bob in order to determine the tuple format and launch attacks later on.

Figure 2:
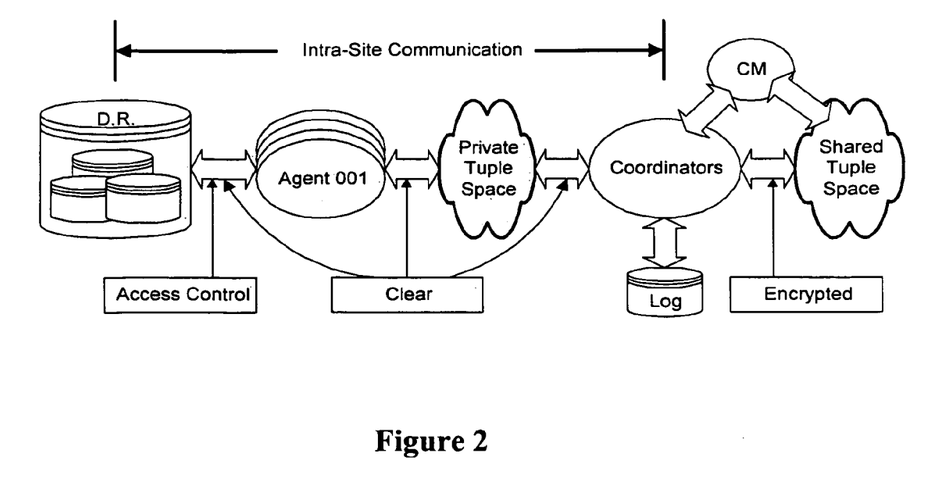
FIG. 2 is a block diagram of a secure communication framework in accordance with the present invention.

Based on the concept of a Virtual Private Network (VPN), an information fortress model has been developed in accordance with the invention for the communication framework of the system. As illustrated in FIG. 2, Coordinators in each site act as "software routers" forming a "virtual firewall" for separating incoming and outgoing messages from the intra-site communications. Two types of tuple spaces are employed to handle inter-agent communications. All of the outgoing messages are encrypted and then posted to a Shared Tuple Space which is known to all sites/organizations in the network, whereas the intra-site communication messages are exchanged on a Private Tuple Space known only to local agents. These latter messages may either be encrypted or exchanged in clear form. If encrypted, the local encryption keys are completely irrelevant to the Coordinators.

The framework of FIG. 2 allows the system to ensure secure communication between sites, independently of the agents. Since it is the responsibility of the Coordinators to implement inter-site data encryption, decryption and other security operations such as digital signature, agents can be developed and implemented without requiring consideration of inter-site communication privacy. Provided that the Coordinators are properly installed and configured at each site, the architecture of a system in accordance with the inventive framework may be implemented on a very large scale.

The Coordinator Manager (CM) is a software component which is responsible for initializing and managing the site Coordinators. There is only one CM at each site. The identity/name of the site CM is the only public information provided to the outside world, and it is globally unique. One pair of Coordinators is created/initiated for every inter-site communication session by the CMs of the two sites, following successful user/agent authentication. This framework also enables the Coordinators to screen the sender's information, such as the caller's ID, for each outgoing message. This feature is particular important in countering Traffic Analysis attacks which might otherwise be launched against the MicMac Tuple Space.

Figure 3:
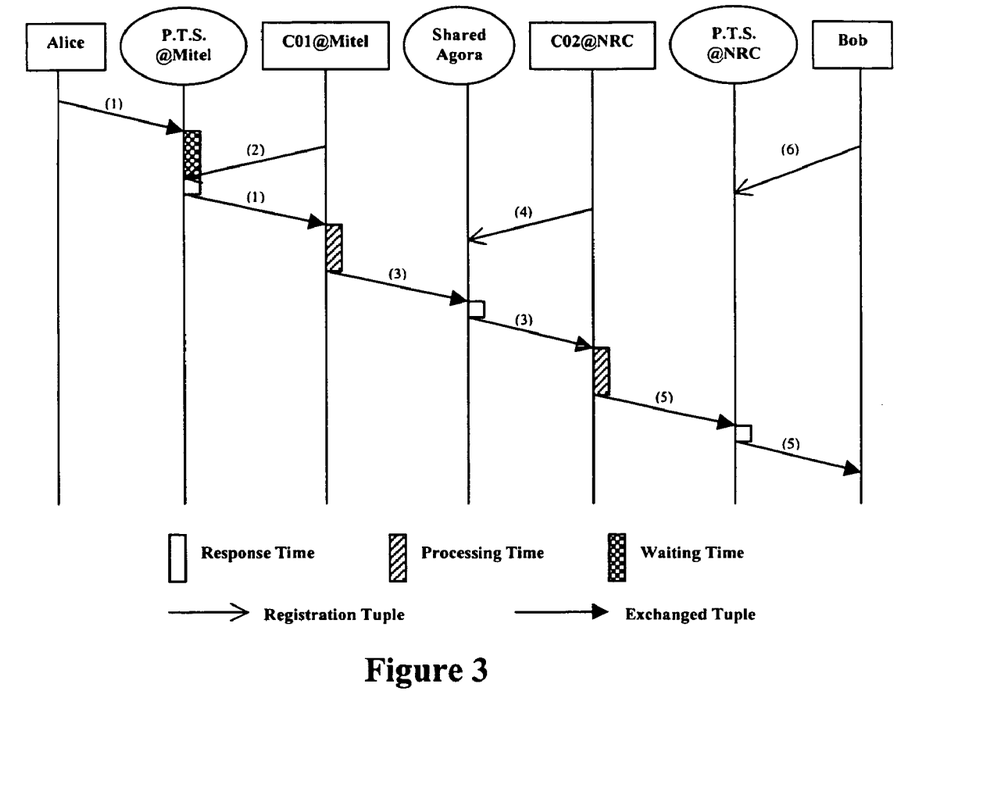
FIG. 3 is a message flow diagram showing a sequence of messages for an exemplary communication session in accordance with the principles of the present invention.

To illustrate how the framework of FIG. 2 works, consider an example wherein Alice from Mitel sends a "Hello" message to Bob at NRC. FIG. 3 shows the message flow for such an exchange. According to the framework, Alice first posts a tuple to the Private Tuple Space at Mitel:

(1) Tuple{("sender", "Alice@Mitel"), ("receiver", "C01@Mitel"), ("forwardTo", "Bob@NRC"), ("content", "Hello")}

The coordinator "C01@Mitel" then picks this tuple by listening to the Private Tuple Space, as follows:

(2) Tuple{("sender", any), ("receiver", "C01@Mitel"), ("forwardTo", any), ("content", any)}

Then, the coordinator will converts the picked tuple to another tuple, and post it to the Shared Tuple Space:

(3) Tuple{("sender", "C01@Mitel"), ("receiver", "C02@NRC"), ("content", aTuple)}

Where aTuple=Tuple{("sender", "Alice@Mitel"), ("receiver", "Bob@NRC"), ("content", "Hello")}

Next, the coordinator called "C02@NRC" picks this tuple by registering the following request at the Shared Tuple Space:

(4) Tuple{("sender", "C01@Mitel"), ("receiver", "C02@NRC"), ("content", any)}

After stripping off the unwanted headers, C02@NRC forwards the content to Bob via the Private Tuple Space at NRC in form of a tuple, as follows:

(5) Tuple{("sender", "C02@NRC"), ("receiver", "Bob@NRC"), ("content", aTuple)}

Bob then retrieves the message from the Private Tuple Space by sending a pick request as follows:

(6) Tuple{("sender", "C02@NRC"), ("receiver", "Bob@NRC"), ("content", any)}

Finally, Bob parses the tuple and extracts the value of content, thereby recovering the message "Hello" from Alice.

If both Coordinators have agreed on one secret key, tuples on the Shared Tuple Space, such as the tuple (3), can be encrypted (completely or partially) using the secret key, as follows:

Part Encryption:
(a) Tuple{("sender", "C01@Mitel"), ("receiver", "C02@NRC"), ("content", E(aTuple))}
(b) Tuple{(E("sender"), "C01@Mitel"), (E("receiver"), "C02@NRC"), (E("content"), aTuple)}

Full Encryption:
(c) Tuple{(E("sender"), E("C01@Mitel")), (E("receiver"), E("C02@NRC")), (E("content"), E(aTuple))} wherein E("string") means encrypt the string ("string"), which can be a key or a value, and wherein E(aTuple) means encrypt all of the keys and values of the tuple (aTuple).

The first expression (a) only encrypts the value of the content field, so that an attacker would still be able to remove this tuple or use the same format to send "spam" messages to Bob. By way of contrast, the expression (c), although offering full security, is unwieldy and time consuming to implement. From a security point of view, the full encryption of (c) offers no advantages over (b) provided that appropriate measures are taken to protect the physical memory of the MicMac server from being scanned by unauthorized agents.

Nonetheless, the full encryption provided by (c) enables an agent to hide sensitive information inside the content of the embedded tuple so that neither the Coordinators nor other unintended agents are able to browse it. Moreover, the Coordinators of the session can utilize the outer fields of the message to include information for other network services such as routing or QoS. This control information is encrypted in order to counter Traffic Analysis attacks. Furthermore, it is important that this information not be encrypted using the same key as the one for the embedded tuple since the Coordinator would then be able to perform decryption on the embedded tuple and see the original message. Accordingly, two different session keys must be used, one (the outer key) for control information, and another (the inner key) for the embedded tuple (i.e. the "real" data). Rather than using two protocols for generating the inner and outer keys, any one of several well known traditional and reliable protocols may be used to establish the inner key, while the outer key is computed out of the inner key using a one way hash function. One advantage of this solution is that the Coordinators can only encrypt/decrypt the control information, whereas the end users (i.e. caller and callee) are able to encrypt/decrypt the entire tuple.

Returning to the previous example, and assuming that the inner and outer keys have been created, the following message exchange takes place, wherein Eo("M") means encrypt string M using the outer key, and Ei("M") means encrypt M with the inner key.

First, Alice posts the following encrypted tuple to the Private Tuple Space.
(1) Tuple{(Eo("sender"), Eo("Alice@Mitel")), (Eo("receiver"), Eo("C01@Mitel")), (Eo("forwardTo"), Eo("Bob@NRC")), (Eo("content"), Ei("Hello"))}

The Coordinator "C01@Mitel" picks this tuple from the Private Tuple Space as follows:
(2) Tuple{(Eo("sender"), any)), (Eo("receiver"), "C01@Mitel")), (Eo("forwardTo"), any)), (Eo("content"), any))}

Then, the Coordinator converts this tuple, and posts it to the Shared Tuple Space:
(3) Tuple{(Eo("sender"), Eo("C01@Mitel")), (Eo("receiver"), Eo("C02@NRC")), (Eo("content"), aTuple)}

Where aTuple=Tuple{(Eo("sender"), Eo("Alice@Mitel")), (Eo("receiver"), Eo("Bob@NRC")), (Eo("content"), Ei("Hello"))}

Next, the Coordinator "C02@NRC" picks this tuple by registering the following request on the Shared Tuple Space:
(4) Tuple{(Eo("sender"), Eo("C01@Mitel")), (Eo("receiver"), Eo("C02@NRC")), (Eo("content"), any)}

After stripping off the unwanted headers, C02@NRC forwards the contents to Bob via the Private Tuple Space at NRC in form of the following tuple:
(5) Tuple{(Eo("sender"), Eo("C02@NRC")), (Eo("receiver"), Eo("Bob@NRC")), (Eo("content"), aTuple)}

Bob retrieves the message from the Private Tuple Space by sending the following pick request:
(6) Tuple{(Eo("sender"), Eo("C02@NRC")), (Eo("receiver"), Eo("Bob@NRC")), (Eo("content"), any)}

Finally, Bob parses the tuple and extracts the value of content, decrypts and then recovers the message "Hello" from Alice.

Since one random key needs to be created prior to the establishment of the secure communication session, an authentication framework has been developed in accordance with the present invention for implementing a proper authentication and key exchange protocol.

Figure 4:
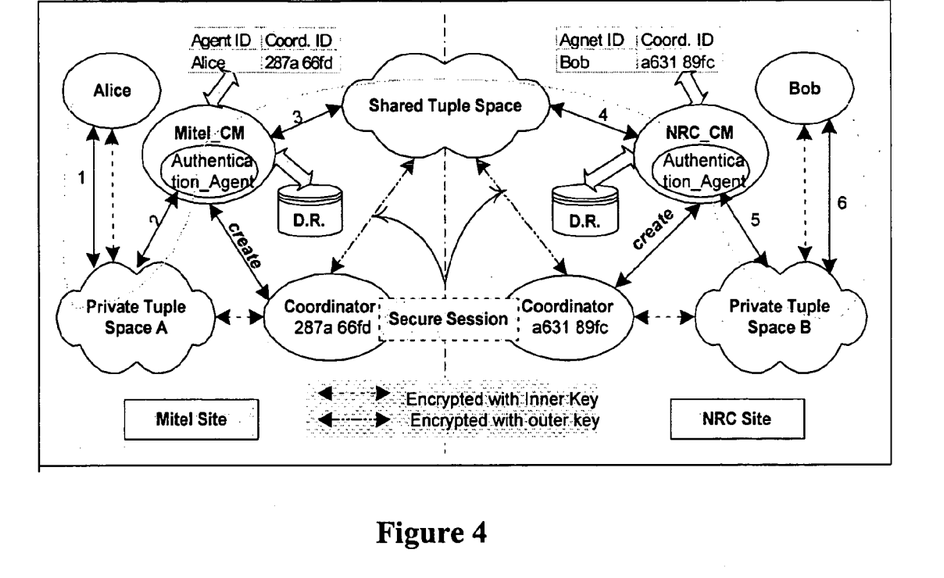
FIG. 4 is a block diagram of the secure communication framework of FIG. 2 for the exemplary communication session of FIG. 3.

With reference to FIG. 4, the caller (e.g. Alice) initiates the request (1) and sends it to the local site CM (e.g. Mitel_CM) via the Private Tuple Space A. The Mitel_CM picks the request (2), locates the home site of the intended receiver (e.g. Bob at NRC), and then transmits the request to the NRC site (3). Upon receiving the calling request (4), the NRC_CM transfers the request to Bob via the Private Tuple Space B at NRC ((5) and (6)). Before establishing the connection, the NRC_CM activates the Authentication Agent (User Logon Agent is an instance of Authentication Agent) to authenticate the caller. The agent proposes an authentication and key exchange protocol back to the Mitel_CM together (optionally) with some additional parameters via the dotted virtual path in FIG. 4. The Mitel_CM decides whether or not to activate the second Authentication Agent, according to the local site security policy. Provided that the proposed authentication and key exchange protocol is allowed and supported at Mitel site, the two Authentication Agents follow the established schema to mutually authenticate the caller and the callee. During this authentication process, both the caller and the callee may be contacted by the Authentication Agents, which may or may not verify their identities against the site's private Data Repository (D. R.).

As a result of successful authentication and key exchanges, the two Authentication Agents agree on three pieces of secret information: one session key and two dynamic identifiers. The session key (i.e. inner key) is passed to the caller (Alice) and the callee (Bob), whereas the hashed value of the session key and the two identifiers are used to generate Coordinator instances. The creation of the two Coordinators establishes the secure communication session between Alice and Bob. The hashed value (i.e. outer key) assigned to the Coordinators is used to encrypt/decrypt all of the keys of the tuples as well as the values of outer fields used for control purpose. Alice and Bob then use the inner key to encrypt/decrypt the embedded tuple.

In accordance with another aspect of the invention, each site CM maintains a dynamic table containing the Ids of all on-line (i.e. active) agents and the Ids of their corresponding Coordinators. Using this table, the site CM is able to detect possible Impersonation attacks. By defining a unique ID for each agent, it is easy for the system to make sure that at any given time, there is no more than one session established for a particular agent.

Without a positive result of the authentication procedure, a communication session will not be initialized since no Coordinator will have been be created. Thus, the only possible way for an attacker to break an established session is to correctly guess the two random IDs (preferably 64 bits each) of the Coordinators and the session key (preferably 112 bits). Such a correct guess would be extremely difficult and computationally infeasible.

Integrity checking is another important technique employed in the present invention to ensure secure communication. To achieve this, a Digital Signature is attached to the original message. Integrity of a message can then be verified by performing the same signature function on the message and comparing the result with the attached Digital Signature. In symmetric cryptosystem, digital signatures can be computed using one way hash functions such as MD4, MD5 or SHA (Secure Hash Algorithm). The a successful prototype of the present invention supports all of the foregoing signature functions.

Figure 5:
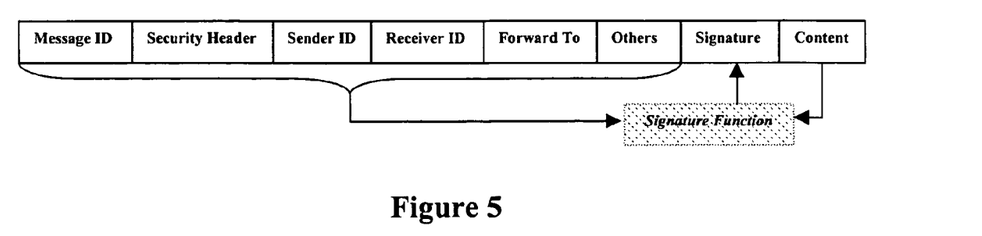
FIG. 5 shows a preferred format for an inter-site communication tuple format in accordance with the present invention.

The format for the tuples used in inter-site communication preferably should conform to a predetermined format, as shown in FIG. 5.

The Message ID specifies a unique sequence number as well as the type of the message. Security Header contains information about the security settings of the current communication session, including the names of the encryption algorithm, the signature function and some parameters. An example of a security header is "Triple_DES-112 SHA-80". Sender ID and Receiver ID specify the expected sender and receiver of the tuple (which can, for example, be the names of the site CMs during the initialization period or the dynamic IDs of the Coordinators constituting the secure session). Forward To is used when one agent sends a message to another agent at a different site via Coordinators. The Signature field contains the digital signature of the entire tuple. The Content field is used to carry real communication data or the embedded tuple. For additional control information, the Others field can be used. Moreover, additional Others fields may be added if needed.

During the initialization phase (i.e. authentication and key exchange), attributes are not encrypted. Furthermore, some attributes may not be used such as Security Header, Others and Signature. However, once a secure session has been established, all of the attributes are used and encrypted.

Figure 6:
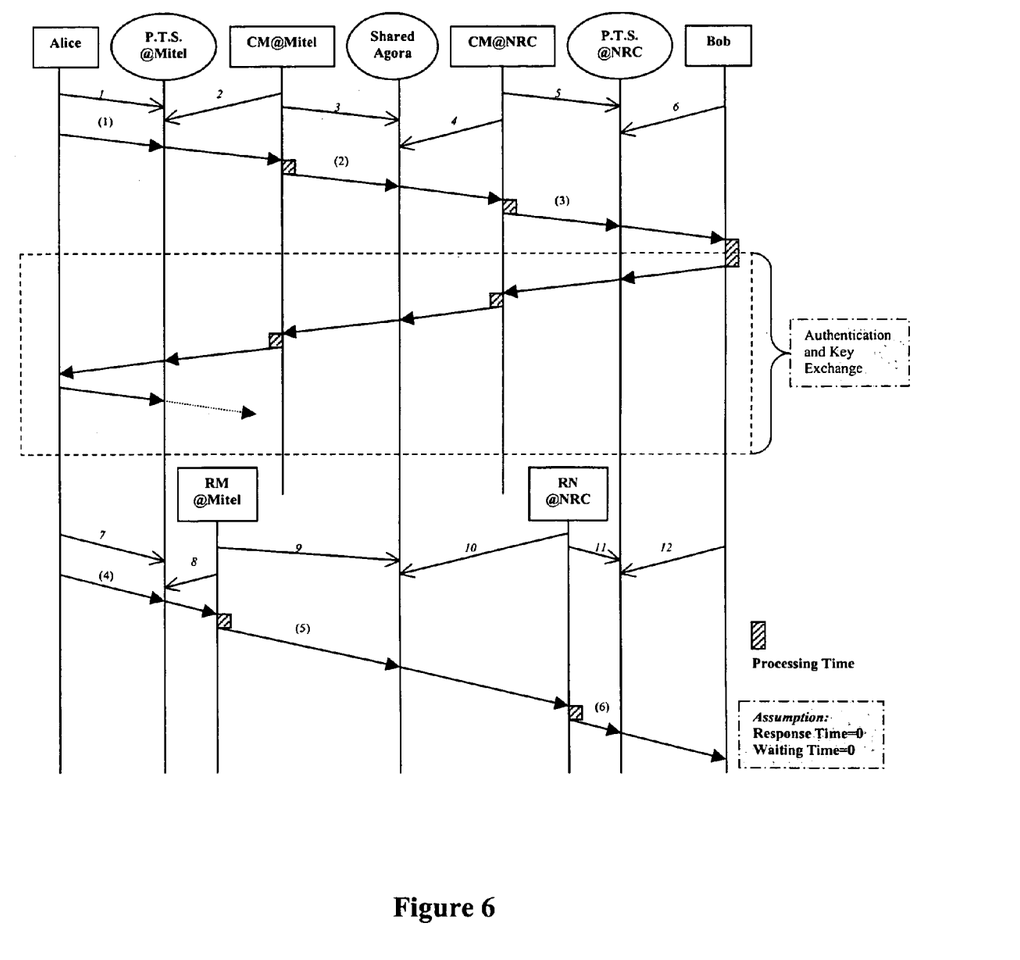
FIG. 6 is the message flow diagram of FIG. 3 expanded to show authentication and key exchange transactions in accordance with the preferred embodiment.

FIG. 6 illustrates the entire process for establishment of a secure communication session between Alice and Bob, including the message exchanges between them. In this example, it is assumed that both waiting time and response time for all the exchanged tuples are negligible. This means that a posted tuple will be removed from the tuple space immediately, which indicates that the corresponding pick request should be registered at the tuple space prior to the arrival of the posted tuple. Continuing on the basis of this assumption, there are six pre-registered pick requests for all of the three tuple spaces, with the format of the inter-site tuples being as set forth in FIG. 5, and the format for the intra-site tuples being the same (for the sake of simplicity):

| | | | | | | | | |
|---|---|---|---|---|---|---|---|---|
| 1. | any | basic | CM@Mitel | Alice@Mitel | null | any | any | any |
| 2. | any | basic | any | CM@Mitel | any | any | any | any |
| 3. | any | basic | any | CM@Mitel | null | any | any | any |
| 4. | any | basic | any | CM@NRC | null | any | any | any |
| 5. | any | basic | any | CM@NRC | any | any | any | any |
| 6. | any | basic | CM@NRC | Bob@NRC | null | any | any | any |

The first tuple, for example, would be:

Tuple{("Message ID", any), ("Security Header", "basic"), ("Sender ID", "CM@Mitel"), ("Receiver ID", "Alice@Mitel"), ("Forward To", null), ("Others", any), ("Signature", any), ("content", any)}

The value "basic" can be defined as "null-0-sha-80", which means the tuple is not encrypted but is digitally signed using Secure Hash Algorithm. The signature contained in the tuple is the first 80 bits of the SHA output/digest.

Moreover, in order to carry binary data in a tuple, this data must be converted into a text stream. Base64 Encoding, as defined in MIME, was employed as the only one encoding algorithm in the successful prototype of this invention.

Tuples (1) through (3) are the initial tuples requesting the authentication process between Alice and Bob, as follows:

| | | | | | | | | |
|---|---|---|---|---|---|---|---|---|
| (1) | 0001 | basic | Alice@Mitel | CM@Mitel | Bob@NRC | null | sig1 | Hello | where sig1 stands for the actual encoded signature stream of the tuple,

| | | | | | | | | |
|---|---|---|---|---|---|---|---|---|
| (2) | 0002 | basic | CM@Mitel | CM@NRC | Bob@NRC | null | sig2 | Tuple 1 | where sig2 is the signature of the tuple, and Tuple 1 is an embedded tuple defined as:

Tuple{("Message ID", "0001"), ("Sender ID", "Alice@Mitel"), ("Receiver ID", "Bob@NRC"), ("content", "Hello")}

| (3) | 0003 | basic | CM@NRC | Bob@NRC | null | null | sig3 | Tuple 1 |
|---|---|---|---|---|---|---|---|---| where sig3 is the signature for tuple (3), and Tuple 1 is the same one as described above in tuple (2).

Before posting any tuple to the tuple space, the creator/sender of the tuple is responsible for calculating the digital signature for the entire tuple. On the other hand, the receiver must verify the integrity of the tuple by checking the value of the signature field immediately after removing a tuple from the tuple space. If the receiver determines that the tuple has been changed during transmission, the receiver discards the message and/or asks the sender to re-send it.

Once Bob recovers the "Hello" message, the mutual authentication process begins. The authentication agent inside the site CM (see FIG. 4) is responsible for initiating this task. The details of the authentication process are not described in any further detail herein, but conform to well known standard authentication and key exchange protocols.

As a result of the authentication and key exchange process, the two parties have an agreed security setting (SecSet) for the session, and the following random numbers have been generated:

a. An inner key (Ki), which is the result of the key exchange.
b. Two dynamic IDs (RM and RN), which are used to create dynamic Coordinators for the session.
c. An outer key (Ko), which is the hashed value of the inner key.

Ki is passed to Alice and Bob by their respective corresponding authentication agents. RM, RN and Ko are used as parameters when creating the Coordinator instances: RM as the identifier for the Mitel Coordinator and RN for the NRC Coordinator.

After establishment of the communication session, Alice, Bob and the two Coordinators immediately register to the tuple spaces for any incoming messages. FIG. 6 shows registration of six (7~12) such requests, in total, wherein the keys/attributes of the tuple are encrypted using Ko:

| 7. | any | SecSet | RM@Mitel | Alice@Mitel | null | any | any | any |
|---|---|---|---|---|---|---|---|---|

The text version for the above tuple is:

Tuple{(Eo("Message ID"), any), (Eo("Security Header"), "SecSet"), (Eo("Sender ID"), "RM@Mitel"), (Eo("Receiver ID"), "Alice@Mitel"), (Eo("Forward To"), null), (Eo("Others"), any), (Eo("Signature"), any), (Eo("content"), any)}

| 8. | any | SecSet | Alice@Mitel | RM@Mitel | Bob@NRC | any | any | any |
|---|---|---|---|---|---|---|---|---|

The value of the field "Forward To" (Bob@NRC) is optional, because RM@Mitel will only communicate with RN@NRC, which forwards the message to Bob only.

| 9. | any | SecSet | RN@NRC | RM@Mitel | Alice@Mitel | any | any | any |
|---|---|---|---|---|---|---|---|---|
| 10. | any | SecSet | RM@Mitel | RN@NRC | Bob@NRC | any | any | any |
| 11. | any | SecSet | Bob@NRC | RN@NRC | Alice@Mitel | any | any | any |
| 12. | any | SecSet | RN@NRC | Bob@NRC | null | any | any | any |

Because of the randomness of the outer key (Ko), which is used to encrypt the attributes, it is infeasible for any other agent to generate any of the above requests.

After the foregoing message exchange, Alice sends her message to Bob in a secret way. First, she encrypts the message (Msg) using the inner key (Ki), and assigns the result of the encryption (Ei(Msg)) as the value of the content, or more accurately, the Eo("content")) field.

| (4) | 0004 | SecSet | Alice@Mitel | RM@Mitel | Bob@NRC | null | sig4 | Ei(Msg) |
|---|---|---|---|---|---|---|---|---|

This tuple is then picked by RM@Mitel, and forwarded to RN@NRC in the following tuple:

| (5) | 0005 | SecSet | RM@Mitel | RN@NRC | Bob@NRC | null | sig5 | Ei(Msg) |
|---|---|---|---|---|---|---|---|---|

It should be noted that, in tuple (5), although an embedded tuple could be used in the content field, it is not necessary since Bob will know that the message comes from Alice once he receives the following one from RN@NRC.

| | 0006 | SecSet | RN@NRC | Bob@NRC | null | null | sig6 | Ei(Msg) |
|---|---|---|---|---|---|---|---|---|

After Bob receives this tuple, he can decrypt the value of the content field (Ei(Msg)) using the inner key (Ki) and thereby recover the message Msg from Alice.

In summary, according to the present invention the hashed value of the random inner key which is used to encrypt pure communication data or embedded tuples, is used to encrypt the header information for control purpose. Therefore, communication entities/agents are able to see the entire content of a tuple, whereas authorized routing components or Coordinators only see the format of the tuple and some control information. Unauthorized agents or Coordinators are prevented from seeing any tuple content of an established session even if they have knowledge of the format/key combinations of the session.

Other embodiments and variations of the invention are possible. All such additional embodiments and applications are believed to be within the sphere and scope of the invention as defined by the claims appended hereto.

What is claimed is:

1. A virtual network communication system for effecting secure communications between user agents at different sites within said virtual network, comprising:
   at least one Private Tuple Space within each of said sites for effecting intrasite communications between agents at each of said sites;
   a Shared Tuple space for effecting inter-site communications between said different sites; and
   a Coordinator Manager within each of said sites for receiving user initiated communication requests from said Private Tuple Space to communicate between user agents at said different sites, authenticating said requests and in response dynamically creating and managing instances of Coordinators at each of said different sites which embed messages from said user agents in secure tuples and exchange said secure tuples over said Shared Tuple Space.

2. The virtual network communication system of claim 1, wherein each said Coordinator Manager further includes an Authentication Agent for negotiating authentication and key exchange protocols there between and in response generating and forwarding an inner key to each of said user agents at said different sites for encrypting and decrypting said messages embedded in said secure tuples, and for generating two dynamic identifiers used to create said Coordinator instances and a hashed value of said inner key for encrypting and decrypting said secure tuples.

3. The virtual network communication system of claim 2, further including a Data Repository within each of said sites for storing authentication data applicable to local ones of said user agents, said authentication data being accessible to said Authentication Agent for negotiating said authentication and key exchange protocols.

4. The virtual network communication system of claim 1, wherein said Coordinator Manager further includes a dynamic table containing IDs of all active ones of said user agents and corresponding ones of said Coordinators for detection of impersonation attacks against said virtual network communication system.

5. The virtual network communication system of claim 1, wherein said Coordinators calculate and verify digital signatures for each of said secure tuples thereby ensuring message integrity.

6. A method of effecting secure virtual network communications between user agents at different sites within said virtual network, comprising of the steps of:
   authenticating user initiated requests to communicate between user agents at said different sites;
   generating and forwarding an inner key to each of said user agents at said agents at said different sites for encrypting and decrypting messages exchanged there between; and
   dynamically creating and managing instances of Coordinators at each of said different sites for embedding said messages in secure tuples and exchanging said secure tuples over a Shared Tuple Space between said different sites.

7. The method of claim 6, further comprising the steps of generating two dynamic identifiers for creating said Coordinator instances and generating a hashed value of said inner key as said outer key for encrypting and decrypting said control information in said secure tuples.

8. The method of claim 6, further comprising the step of separating QoS and other control information needed by said network from user information communicated between said user agents.

9. The method of claim 8, further comprising the steps of:
encrypting and decrypting said user information in embedded tuples exchanged on Shared Tuple Space by each of said user agents at said different sites using said inner key; and encrypting and decrypting said secure tuples and control information exchanged on said Shared Tuple Space by said Coordinator instances using a hash value of said inner key for effecting secure dynamic sessions.

* * * * *